Sept. 29, 1942.       C. HAHN ET AL       2,297,472
PHASE CONNECTION FOR MECHANICAL RECTIFIERS
Filed Dec. 9, 1941

WITNESSES:

INVENTORS
Carl Hahn and
Wilhelm Feldmann
BY
S. A. Stricklett
ATTORNEY

Patented Sept. 29, 1942

2,297,472

UNITED STATES PATENT OFFICE 2,297,472

PHASE CONNECTION FOR MECHANICAL RECTIFIERS

Carl Hahn, Berlin-Siemensstadt, and Wilhelm Feldmann, Berlin-Staaken, Germany; vested in the Alien Property Custodian Application December 9, 1941, Serial No. 422,220
In Germany May 27, 1939

4 Claims. (Cl. 172—280)

This invention relates to a motor control system, and particularly to a system for insuring that a synchronous motor falls into step at a predetermined angular relation of the rotor of a motor.

During operation of certain devices, such as contactor rectifiers, impulse generators, timers, and such like, it is essential that there be a certain angular relation of the drive motor rotor to the operating portion of the driven mechanism. Non-excited synchronous motors and synchronous motors of the excited type having more than one pair of excited poles may fall into step or synchronism at any one of a plurality of angular rotor positions.

Heretofore, it has been necessary either to use cumbersome mechanical devices for adjusting the angular position of the driven mechanism with respect to the driving motor or to use a complicated relay system to insure the proper phase or angular position of the rotor of the motor.

It is the object of this invention to provide a simple control system to insure that a motor falls into step at a predetermined angular position of the rotor.

The control system in accordance with this invention includes a contactor device or circuit breaker for momentarily interrupting the supply circuit of a synchronous motor in the event it attempts to fall into step at the wrong angular position of the rotor. A circuit interrupter for the supply line of the motor is actuated by an actuating circuit connected across one phase of the supply line and which is provided with a unidirectional conductor so that current can flow in only one direction in the actuating circuit of the circuit interrupter. A suitable synchronous contactor device is driven by the rotor of the synchronous motor so that if the angular relation of the motor is improper, it will make contact at the interval when the unidirectional conductor will permit current flow in the actuating circuit of the circuit interrupter so that the motor will momentarily be disconnected with the result that normally it will fall into step at another angular relation at which time the contact device driven by the motor completes the actuating circuit at a time when the unidirectional conductor prevents the flow of energy in the actuating circuit and, therefore, prevents operation of the circuit interrupting device.

Figure 1:
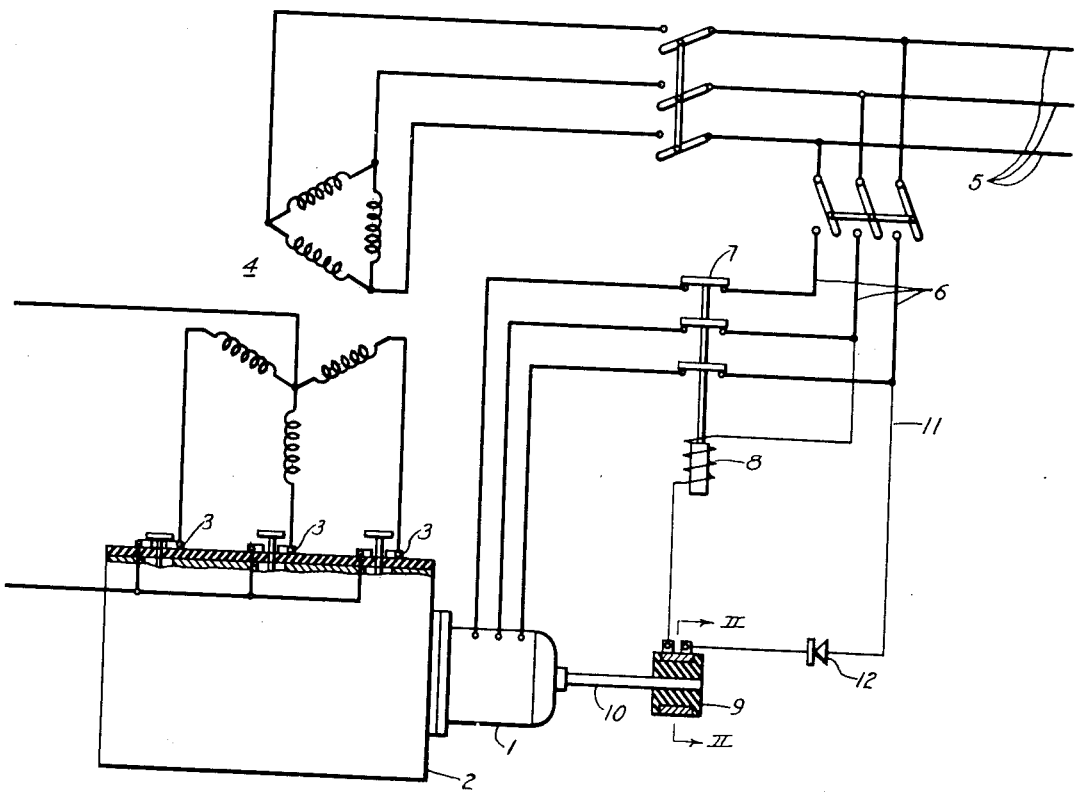
Figure 2:
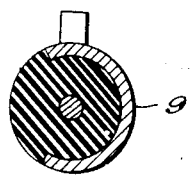

Other objects and advantages will be apparent from the following description taken in connection with the accompanying drawing in which, Figure 1 is a schematic illustration of a control system according to the invention, and Fig. 2 is a cross sectional elevation of the single segment position switch taken on line II—II of Fig. 1.

In the illustrative embodiment of the invention, a synchronous motor 1, preferably of the unexcited type, is connected in driving relation with a contactor rectifier 2, such as shown in application, Serial No. 239,918, filed November 12, 1938, in which it is necessary for the rotor of the driving motor 1 to have a predetermined angular relation with the operating mechanism of the contactor rectifier 2 so that the contacts 3 upon the rectifier 2 will close at a proper phase position of the supply transformer 4. Both the supply transformer 4 and the synchronous motor 1 are supplied from a suitable polyphase source of supply which may conveniently be the same supply circuit 5 or at least from phase sources of supply. The supply circuit 6 for the driving motor 1 is made through a suitable circuit interrupting device herein shown as a magnetically operated circuit breaker 7. The actuating circuit 11 for the actuating coil 8 of the circuit breaker 7 is connected across one phase of the polyphase supply circuit 6 of the motor 1 through a suitable synchronous contactor herein illustrated as a rotating one segment commutator 9 secured on the rotating shaft 10 of the motor 1. The actuating circuit 11 includes a suitable unidirectional conductor 12 so that current can flow in only one direction in the actuating circuit 11. If the rotor of the synchronous motor 1 falls into step at the wrong angular position, the contact device 9 will close the actuating circuit 11 at a time when current will flow through the unidirectional conductor 12 and actuate the circuit interrupting device 7 so that the power supplied to the motor 1 will be momentarily interrupted so that the rotor will slow down sufficiently to fall back and fall into step at another angular position. When the rotor falls into step in such angular position that the contact device 9 completes the actuating circuit 11 of the circuit interrupter 7 in such a manner that the unidirectional conductor 12 prevents the flow of current through the actuating circuit 11, the circuit interrupter 7 will not be opened and the motor 1 will continue to run in the proper angular position.

For purposes of illustration we have shown a specific embodiment of our invention, but it will be apparent that changes and modifications can be made therein without departing from the true spirit of the invention or the scope of the appended claims.

What is claimed is:

1. In a synchronous non-excited motor a rotor positioning system comprising a polyphase supply circuit for the motor, a rotating contactor driven by the rotor of the motor, a circuit interrupter in said supply circuit, an actuating coil for said circuit interrupter, circuit means including said rotating contact, for connecting said actuating coil across one phase of the supply circuit and a unidirectional conductor in series with said circuit means.

2. A synchronous driving system comprising a synchronous motor having a rotor which can fall into step in a plurality of positions, a polyphase supply circuit for said motor and means for determining the running position of said rotor including a contactor driven by said motor, a circuit interrupter in said supply circuit, circuit means including said contactor for operating said circuit interrupter and a unidirectional conductor in said circuit means.

3. A device for operating a mechanical rectifier at the proper phase position comprising a non-excited synchronous motor, a synchronous commutator mounted on the shaft of the motor, a polyphase supply circuit for said motor, said supply circuit being in phase with the supply circuit of the rectifier, a circuit interrupter in the supply circuit of the motor, an actuating coil for said circuit interrupter, circuit means including said synchronous commutator for connecting said actuating coil across one phase of the supply circuit and a static rectifier in series with said actuating coil.

4. In a synchronous motor drive, a rotor positioning system comprising a polyphase supply circuit for said motor, a synchronous contactor driven by said motor, a switching device in said supply circuit, an operating circuit for said switching device including said synchronous contactor, said circuit being connected across one phase of the supply circuit and a unidirectional conductor in said operating circuit.

CARL HAHN.
WILHELM FELDMANN.